(12) United States Patent
Ferrari et al.

(10) Patent No.: US 7,552,972 B2
(45) Date of Patent: Jun. 30, 2009

(54) POWER ASSIST FOLD AND TUMBLE VEHICLE SEAT

(75) Inventors: Michael Ferrari, St. Clair Shores, MI (US); Michael Walkowski, Brownstown, MI (US); Mark Allyn Folkert, Farmington Hills, MI (US); David Williams, South Lyon, MI (US); Eric Woods, Allen Park, MI (US)

(73) Assignee: Lear Corporation, Southfield, MI (US)

( * ) Notice: Subject to any disclaimer, the term of this patent is extended or adjusted under 35 U.S.C. 154(b) by 475 days.

(21) Appl. No.: 11/143,690

(22) Filed: Jun. 2, 2005

(65) Prior Publication Data
US 2006/0273645 A1 Dec. 7, 2006

(51) Int. Cl.
*B60N 2/10* (2006.01)
(52) U.S. Cl. .............................. 297/378.12; 296/65.09; 296/65.17
(58) Field of Classification Search ............ 297/378.12; 296/65.17, 65.09, 65.05
See application file for complete search history.

(56) References Cited

U.S. PATENT DOCUMENTS

| | | | |
|---|---|---|---|
| 4,606,577 A | 8/1986 | Hirama et al. ............... 296/331 |
| 4,699,418 A | 10/1987 | Plavetich | |
| 4,869,541 A | 9/1989 | Wainwright ............... 296/65.1 |
| 5,507,561 A | 4/1996 | Fourrey et al. ......... 297/378.12 |
| 5,593,208 A | 1/1997 | Mitschelen et al. ......... 297/336 |
| 5,871,255 A | 2/1999 | Harland et al. .............. 297/336 |
| 5,941,602 A | 8/1999 | Sturt et al. ................... 297/340 |
| 6,000,742 A | 12/1999 | Schaefer et al. .......... 296/65.09 |
| 6,012,755 A | 1/2000 | Hecht ....................... 286/65.03 |
| 6,024,411 A | 2/2000 | Pesta et al. .................. 297/325 |
| 6,039,401 A | 3/2000 | Rus ....................... 297/378.13 |
| 6,048,030 A | 4/2000 | Kanda et al. ................. 297/341 |
| 6,131,999 A | 10/2000 | Piekny et al. .......... 297/378.12 |
| 6,135,555 A | 10/2000 | Liu et al. ..................... 297/336 |
| 6,149,235 A | 11/2000 | Fahim ...................... 297/259.2 |
| 6,227,619 B1 | 5/2001 | Pesta et al. ............. 297/378.12 |
| 6,250,704 B1 | 6/2001 | Garrido ................... 296/65.05 |
| 6,293,620 B1 | 9/2001 | Fast ........................... 297/325 |
| 6,345,867 B1 | 2/2002 | Hellrung et al. ............. 297/336 |
| 6,402,250 B1 | 6/2002 | Lange ................... 297/378.12 |
| 6,511,129 B1 | 1/2003 | Minor et al. ................. 297/367 |

(Continued)

FOREIGN PATENT DOCUMENTS

DE          199 18 785 C1    2/2000

(Continued)

*Primary Examiner*—Anthony D Barfield
(74) *Attorney, Agent, or Firm*—Bliss McGlynn, P.C.

(57) ABSTRACT

A vehicle seat assembly including a seat backrest, a seat bottom, and a seat frame having a front member and a rear member that operatively supports the seat bottom. A seat backrest rotating assembly allows the seat backrest to move from an upright position to a folded position. The seat frame has a seat rotation mechanism to allow the seat frame to be rotatively lifted upward and move the seat frame to a tumbled position. A first latching mechanism latches and retains the seat backrest in the upright position. A second latching mechanism latches and retains the seat bottom to the vehicle floor. A release assembly has a motor and a cable assembly that is operatively connected to the first latching assembly. The motor is adapted to be remotely actuated to cause the first latching assembly to be operatively released by the cable assembly.

24 Claims, 3 Drawing Sheets

U.S. PATENT DOCUMENTS

| | | |
|---|---|---|
| 6,513,873 B2 | 2/2003 | Tsuda et al. ................. 297/253 |
| 6,533,341 B2 | 3/2003 | Marinelli .................. 296/65.16 |
| 6,568,736 B2 | 5/2003 | Jach et al. ................. 296/65.09 |
| 6,679,536 B1 | 1/2004 | Sonnenberg et al. ..... 296/65.09 |
| 6,698,837 B2 | 3/2004 | Pejathaya et al. ...... 297/378.12 |
| 6,705,658 B2 | 3/2004 | Jach et al. ................. 296/65.09 |
| 6,994,391 B2 * | 2/2006 | Lutzka et al. ............. 296/65.03 |
| 7,121,624 B2 * | 10/2006 | Pejathaya et al. ...... 297/378.12 |
| 7,152,922 B2 * | 12/2006 | Garland ............... 296/65.09 X |
| 2002/0113480 A1 | 8/2002 | Senseby et al. .......... 297/378.1 |
| 2002/0125757 A1 | 9/2002 | LeTournoux ........... 297/378.12 |
| 2002/0135215 A1 | 9/2002 | Magyar et al. ......... 297/378.12 |
| 2006/0097560 A1 * | 5/2006 | Keyser et al. ....... 297/378.12 X |

FOREIGN PATENT DOCUMENTS

| | | |
|---|---|---|
| DE | 199116709 C1 | 2/2000 |
| DE | 10201234 C1 | 1/2003 |
| DE | 102 18 394 A1 | 11/2003 |
| DE | 102 97 476 T5 | 11/2004 |
| GB | 2336772 A | 3/1999 |
| JP | 2005014843 A | 1/2005 |
| WO | WO 99/59836 | 11/1999 |
| WO | WO 2005/025931 A1 | 3/2005 |

* cited by examiner

POWER ASSIST FOLD AND TUMBLE VEHICLE SEAT

BACKGROUND OF THE INVENTION

1. Field of the Invention

The present invention relates, generally, to a vehicle seat assembly and, more specifically, to a vehicle seat assembly having a power assisted fold and tumble movement.

2. Description of the Related Art

To satisfy the demands of the modern driving public, manufacturers are called upon to provide vehicles that are multi-functional and, in addition to having normal passenger carrying capacity, also provide expandable or additional cargo carrying capability. One way to accomplish this goal and increase the vehicle's cargo space to accommodate large or bulky items that need to be transported is to flatten, fold, and/or collapse one or more of the rear seat assemblies. A conventional approach of collapsing rear vehicle seat assemblies to provide additional storage space is one in which the seat back portion folds down onto the seat cushion and then the rear of the seat support assembly is released from the vehicle floor so that the entire seat pivots, or tumbles, forward about the front floor mounting. These seats generally, and their support assemblies more specifically, are referred to as "fold and tumble."

Fold and tumble seat designs vary greatly and are used in different ways in different vehicle types. Fold and tumble seats often appear in 3 and 5 door vehicles in which the rear, or secondary seating is folded and tumbled to open up a rear cargo area when desired. Fold and tumble seats are also employed in mini-vans and SUVs where the secondary seats may fold and tumble to provide ingress and egress to third row seating or to provide additional cargo space if the third row is folded down or removed. Regardless of their specific application, the current fold and tumble seat designs and the manner in which the folded seat tumbles have proven to be problematic.

While the various fold and tumble seat approaches have generally worked for their intended purpose, they tend to be either heavy and difficult to operatively stow or too lightweight to provide the proper support and comfort. Second row seating in a van or SUV type vehicle must typically function as a second family seating area similar to the more robust permanent backseat of a sedan. Second row seating is also often required to hold child and/or booster seats. Thus, if a fold and tumble seat is designed to be very easy for one person to fold and tumble to the stowed position, they tend to be lightweight and more in the realm of a jumpseat. The lightweight fold and tumble seats are sometimes do not stand up well to continued second row regular use.

If a fold and tumble seat is designed as a more rigorous second row seat that is capable of properly supporting child seats and withstanding constant usage, the resultant seat is sturdier and usually heavier form. This, by itself, does not make the seat undesirable. However, it tends to make the seat difficult to fold and tumble to the stowed position as originally intended. More specifically, a fold and tumble seat includes hinge mechanisms at the front of the seat, a floor latching mechanism to secure the rear of the seat to the floor, and a seatback latching mechanism to lock the seat back in the upright position. The floor and seatback latches mechanisms must be released by the operator when it is desired to fold and tumble the seat in the stowed position. Sequentially, after the seatback latching mechanism is first released, the seat back is folded forward onto the seat bottom. This then requires the operator to release the floor latching mechanism while attempting to lift the rear of the seat and rotate it forward. Considering the weight and structure of the more substantial types of fold and tumble seats, this combined release and stowing operation can be difficult for a great many individuals.

Operationally, fold and tumbling stowage is performed through an open side door or sliding door with the operator standing outside and leaning in. In the case of a van type vehicle with a sliding door installed on only one side, the far side fold and tumble seat must be stowed with the operator in the vehicle compartment kneeling behind or to the side of the seat. Further, depending upon the configuration of the vehicle, the second row fold and tumble seating may be stowed by a third row occupant as necessary to egress the rear of the vehicle. In any case, the operator attempting the fold and tumble operation generally does not have a good position for balance and leverage while performing the stow. This disadvantage to fold and tumble seating is compounded when a smaller individual or one with lower upper body strength attempts the stowing operation. Thus, there remains a need in the art for a power assisted fold and tumble vehicle seat that has the capability performing the stowing operation by itself with minimal operator input.

SUMMARY OF THE INVENTION

The disadvantages of the related art are overcome by the present invention that provides a vehicle seat assembly including a seat backrest, a seat bottom, and a seat frame having a front member and a rear member. The seat frame operatively supports the seat bottom and further has at least one seat backrest rotating assembly supported at the rear member that is adapted to allow the seat backrest to move from an upright position to a folded position in which the seat backrest is folded down upon the seat bottom. The seat frame further has at least one seat rotation mechanism disposed on the front member to allow the rear member of the seat frame to be rotatively lifted upward and forward and move the seat frame from a seating position to a tumbled position relative to the front member. A first latching mechanism is adapted to latch and selectively retain the seat backrest in the upright position. A second latching mechanism is adapted to latch and selectively retain the seat bottom to the floor of the vehicle. A release assembly is also includes that has a motor and a cable assembly. The cable assembly is operatively connected to the motor and the first latching assembly. The motor is adapted to be remotely actuated such that actuation of the motor causes the first latching assembly to be operatively released by the cable assembly.

Thus, the present invention has a power assist fold and tumble assembly that overcomes the drawbacks and disadvantages of the prior art by having a release assembly that provides a power driven movement of the vehicle seat so that the operator input is minimized and that little or no operator effort is required to release the seat from the seating position and move it to the stowed position.

Other objects, features and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
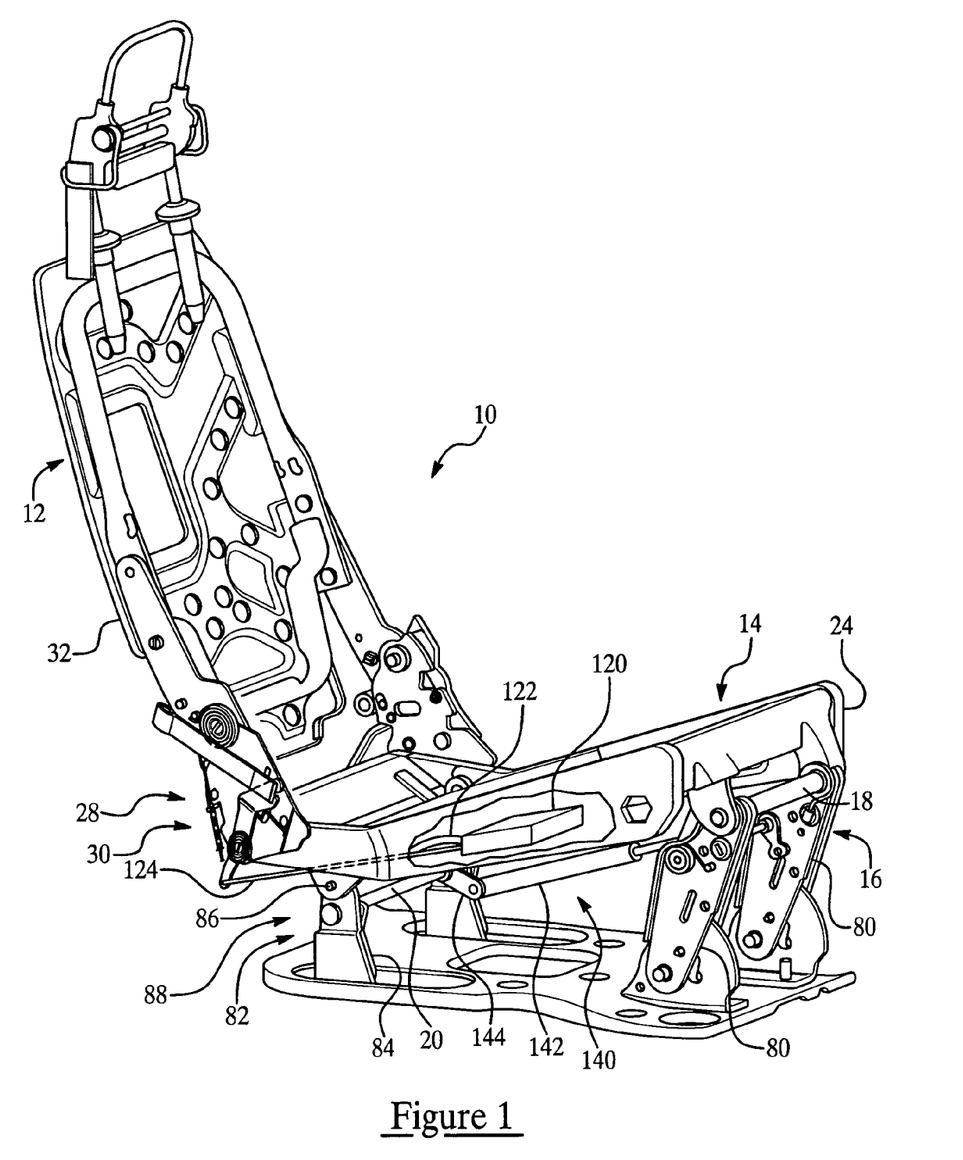
FIG. 1 is a side perspective view of a vehicle seat assembly of the present invention in the upright position without cushions and trim.

A fold and tumble vehicle seat having a release assembly of the present invention is generally indicated as 10 in FIG. 1 where like numerals are employed to designate like structure throughout the figures. The seat assembly 10 is illustrated without padding and trim and includes a seat backrest generally indicated at 12, a seat bottom generally indicated at 14, and a seat frame generally indicated at 16. The seat frame 16 has a front member 18 and a rear member 20. In the preferred embodiment, the seat bottom 14 is a pan 24 that is integrated with the seat frame 16 such that the front and rear members 18 and 20 are disposed in spaced parallel relationship on the seat pan 24. It should be appreciated by those of ordinary skill in the art that the seat bottom and seat frame may also be separate elements with the seat frame including side members that operatively support the front and rear members. The seat pan 24 is formed or stamped from any one of a variety of moldable or malleable materials in a known manner to provide a generally flat shaped pan, which supports a seat cushion (not shown).

As further illustrated in FIG. 1, the seat frame 16 also supports at least one backrest rotating assembly, generally indicted at 28, and a release assembly, generally indicated at 30. The backrest rotating assembly 28 is mounted to the rear member 20 and the seat pan 24. The seat backrest 12 includes a backrest frame 32, which is also mounted to the seat backrest rotating assembly 28. The seat backrest rotating assembly 28 is adapted to allow the seat backrest 12 to move between an upright position and a folded position in which the seat backrest 12 is folded down upon the seat bottom 14.

Figure 2A:
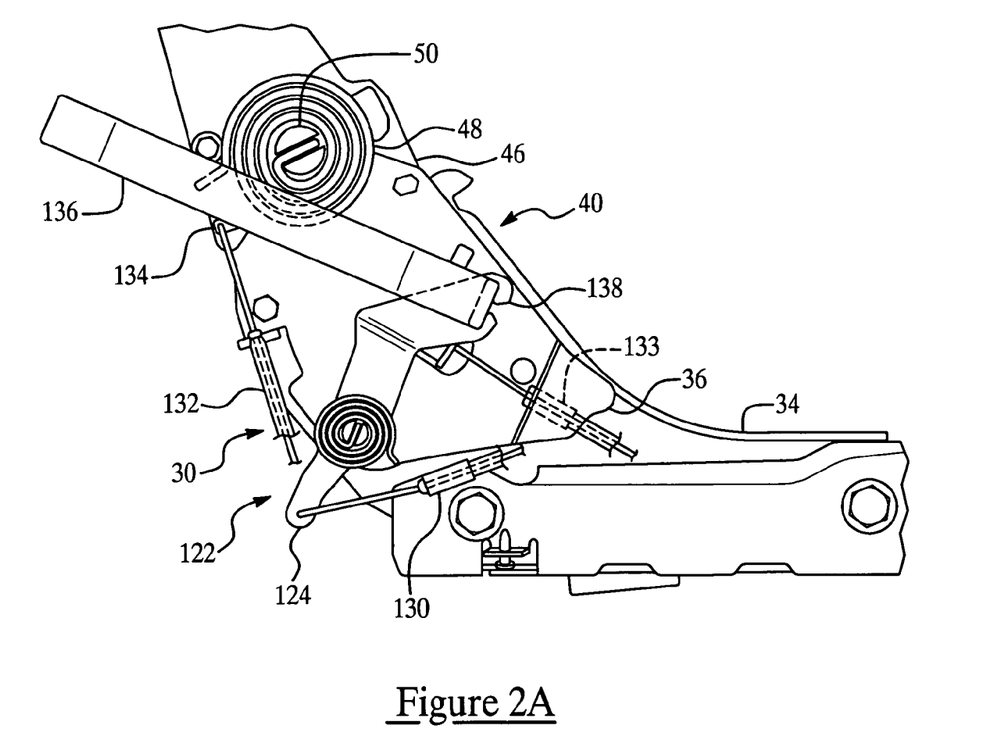
FIG. 2A is a side view of the backrest rotating member and release assembly of the present invention.
Figure 3:
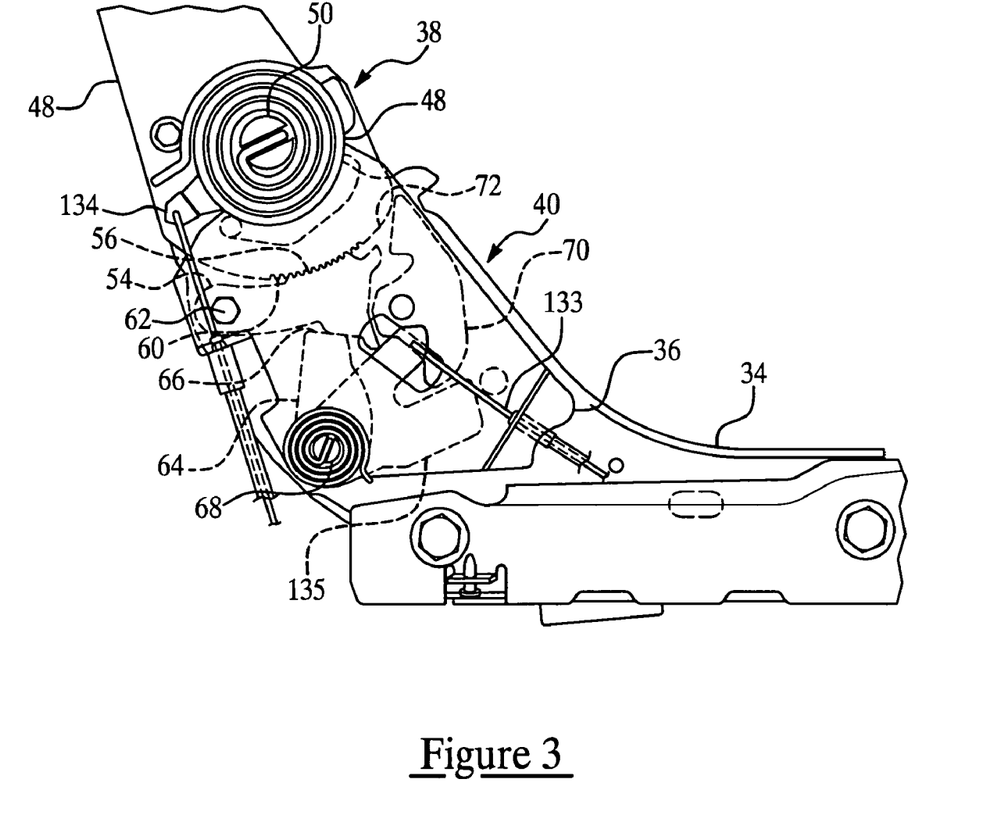
FIG. 3 is side view of the backrest rotating member and release assembly of the present invention with the release assembly removed

As shown in FIGS. 2A and 3 the seat backrest rotating assembly 28 includes a main plate 34, an outer plate 36, a rotation mechanism, generally indicated at 38, and a first or seat backrest latching mechanism, generally indicated at 40. As will be discussed in greater detail below, the main plate 34 and the outer plate 36 are juxtaposed but operatively spaced from one another to allow the main plate 34 and an outer plate 36 to encompass, and provide support to, portions of the rotation mechanism 38, the first latching mechanism 40, and the release assembly 30.

The rotation mechanism 38 includes a backrest bracket 46 that is fixedly mounted to the backrest frame 32, and a backrest biasing member 48. The backrest bracket 46 includes a pivot pin 50 that is operatively disposed through the main plate 34. In the preferred embodiment, as shown in the Figures, the backrest biasing member 48 is formed as a wound spring and is disposed about pivot pin 50, which is adapted to place a counter clock-wise biasing force on the backrest frame 32 relative to the seat backrest rotating assembly 28. Thus, the backrest biasing member 48 causes rotation of the seat backrest 12 from the upright seating position to its folded position on the seat bottom 14 if the seat backrest 12 is not otherwise restrained.

The seat backrest rotating assembly 28 also supports the first latching assembly 40. The first latching assembly 40 includes a backrest locking arm 54 that has a plurality of sector teeth 56 disposed on its upper edge that corresponds to a plurality of sector teeth 60 on the bottom of the backrest bracket 46. The backrest locking arm 54 is pivotably retained between the main plate 34 and the outer plate 36 on pivot pin 62. The locking arm sector teeth 56 and backrest bracket sector teeth 60 cooperate to lock the seat backrest 12 in its upright position. The latching assembly 40 also includes a blocking arm 64 having a blocking face 66. The blocking arm 64 is rotationally biased about pivot point 68 so that the blocking face 66 moves against the locking arm 54 to hold the locking arm teeth 56 in engagement with the backrest bracket teeth 60 when the seat backrest 12 is in the upright position.

The first latching assembly 40 further includes a holding arm 70 that is biased against the backrest bracket 46 and the locking arm 54. The holding arm 70 is adapted to operatively ride along one edge 72 of the backrest bracket 46 such that the backrest bracket 46 causes the holding arm 68 to move against the locking arm 54 when the locking arm 54 rotates out of engagement with the backrest bracket 46. This prevents the locking arm 54 from engaging with the backrest bracket 46 when the seat backrest 12 is folded. The holding arm 70 is further adapted to operatively ride along the backrest bracket edge 72 such that the backrest bracket 46 causes the holding arm 70 to release the locking arm 54 allowing it to engage the backrest bracket 46 when the seat backrest 12 is brought to the upright position. It should be appreciated that other mechanisms may be employed to allow the seat backrest 12 to be adjustable along the length of sector teeth 56, 60 so that the angle of inclination of the seat backrest 12 is selectively adjustable.

As best shown in FIG. 1, the seat frame 16 further includes forward hinge mechanisms, generally indicated at 80 that are disposed on the front members 18. The hinge mechanisms 80 allow the rear members 20 of the seat frame 16 to be rotatively lifted upward and forward and move the seat frame 16 from a seating position to a tumbled position relative to the front members 18 after the seat backrest 12 has been folded down. The seat frame 16 also includes rear floor retention assemblies, generally indicated at 82 that are disposed about the rear members 20 that are adapted to latch and selectively retain the seat bottom 14 to the floor of the vehicle in the seated position. The rear floor retention assemblies 82 include a floor pillar 84 having a striker pin 86 and a second or floor latching mechanism, generally indicated at 88. The striker pin 86 is mounted to floor pillar 84.

Figure 2B:
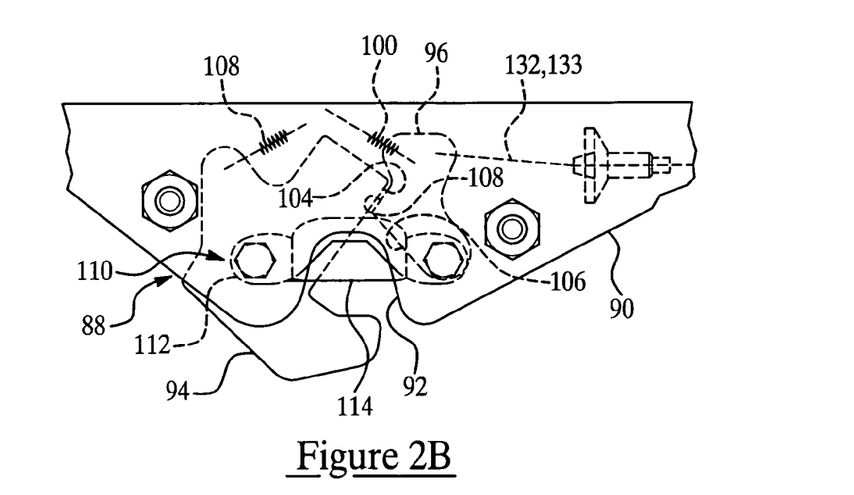
FIG. 2B is a side view that is representative of both of the rear floor retaining assemblies of the present invention.

As best shown in FIG. 2B, the second latching mechanism 88 includes a main plate 90 that has a receiving groove 92 formed to accept the striker pin 86, a latching arm 94, and a blocking arm 96. The latching arm 94 and blocking arm 96 are pivotably mounted to the main plate 90 and each include a biasing member 98 and 100, respectively. The latching arm 94 has a general hook shape having an opened latching face 102 and a closed latching face 104. The blocking arm 96 includes a first blocking face 106 and a second blocking face 108. The latching arm 94 is adapted to capture the striker pin 86 in the receiving groove 92 of the main plate 90. The latching arm biasing member 98 provides a biasing force to rotate the latching arm 94 counter clock-wise to open the receiving groove 92 to allow the striker pin 86 to enter the receiving groove 92 when the seat frame 16 is being brought down from the stowed position into the seating position. The blocking arm biasing member 100 provides a biasing force to rotate the blocking arm 96 clock-wise to interact with the latching arm 94. It should be appreciated that the seat assembly 10 includes two second latching mechanisms 88, one on either side of the seat frame 14.

In the preferred embodiment, each of the second latching mechanisms 88 also includes a shock absorbing assembly, generally indicated at 110. As shown in FIG. 2B, the shock absorbing assembly 110 includes a shell 112 and a resilient member 114. The resilient member 114 is retained in the shell 112 and compresses to accept the striker pin 86. It should be appreciated that the resilient member 114 may be composed of any of a variety of compressible materials used for cushioning and shock absorption that is capable of withstanding the stress loading of a vehicle seat. It should be further appreciated that, as a design consideration, the shock absorbing assembly 110 may be omitted from the second latching mechanisms 88 so that they directly latch the striker pins 86 to the receiving grooves 92.

When the seat 10 is moved from the stowed position and the striker pin 86 is received in the receiving groove 92, the latching arm 94 is deflected clock-wise against the biasing force of latching arm biasing member 98. Before the striker pin 86 engages the latching arm 94, the open latching face 102 of the latching arm 94 is in contact with the first blocking face 106 of the blocking arm 96. As the latching arm 94 accepts the striker pin 86 it is subsequently forced closed and the open latching face 102 of the latching arm 94 rotates past the first blocking face 106 of the blocking arm 96. The blocking arm biasing member 100 then causes the blocking arm 96 to rotate clock-wise so that the second blocking face 108 of the blocking arm 96 engages the closed latching face 104 of the latching arm 94. In this manner, the blocking arm 98 holds the latching arm 94 closed about the striker pin 86, thereby latching, or locking the rear of the seat 10 to the vehicle floor. The blocking arms 96 of each of the rear floor retentions assemblies 82 are also operatively connected to the end of a release cable 132 as will be discussed below.

Referring to FIGS. 1 and 2A, the release assembly 30 includes a motor 120 and a cable assembly, generally indicated at 122, and a release arm 124. The cable assembly 122 is operatively connected to the motor 120 and the first latching assembly 40. The motor 120 is adapted to be remotely actuated such that actuation of the motor 120 causes the first latching assembly 40 to be operatively released by the cable assembly 122. More specifically, as best shown in FIG. 2A, the cable assembly 122 includes a first cable assembly 130, a second cable assembly 132, and a third cable assembly 133. The first cable assembly 130 is operatively connected to the motor 120 and to the release arm 124 at the first latching assembly 40. The release arm 124 is operatively connected to the blocking arm 54 through the pivot point 68. The second cable assembly 132 is operatively connected between the seat backrest rotating assembly 38 at connection point 134 and the blocking arm 96 of one of the second latching mechanisms 88. The third cable assembly 133 is operatively connected between the blocking arm 96 of the other second latching mechanisms 88 and a second release arm 135 as will discussed in detail below. Thus, when the motor 120 causes the first latching assembly 40 to be operatively released by the first cable assembly 130 through the release arm 120 and the seat backrest 12 operatively rotates to the folded position, the seat backrest rotating assembly 28 causes the second latching assembly 88 to be operatively released by the second cable assembly 132.

In the preferred embodiment, the release assembly 30 further includes a release member 136 that is operatively connected to the first latching mechanism 40 through the release arm 120 at a hooked end 138. The release member 136 extends from the seat backrest 12 and is adapted to be pulled outward from the seat backrest 12 to allow for a manual actuation of the release assembly 30.

In this manner, the release assembly 30 is available for an operator to remotely activate the motor 120 to actuate the cable assembly 122 and cause the seat 10 to fold and tumble. More specifically, the activation of the motor 120 causes the first cable assemble 130 to rotate the release arm 124 to move the blocking arm 64 away from the locking arm 54 so that the sector teeth 56, 60 are disengaged and the seat backrest 12 is caused to rotate by the backrest biasing member 48 and the seat backrest 12 folds down upon the seat bottom 14. As the seat backrest 12 folds, the seat backrest rotating assembly 28 draws on the second cable assembly 132 to cause the blocking arm 96 of one of the second latching mechanisms 88 to move away from the latching arm 94 which releases the striker pin 86. As the motor 120 continues to draw on the first cable assembly 130, the release arm 124 rotates further and begins to cause the second release arm 135 to rotate counter clockwise. The counter clock-wise rotation of the second release arm 135 draws on the third cable assembly 133. The third cable assembly 133 releases the blocking arm 96 of the other second latching mechanism 88 thereby freeing the rear of the seat frame from the vehicle floor. In addition to the power assist fold and tumble feature, the operator may manual actuate the fold and tumble operation by pulling outward on the release member 136, which draws on the release arm 124 to cause the same series of operative events.

In the preferred embodiment, as previously discussed, the seat backrest 12 will fold down upon the seat bottom 14 by itself under the biasing influence of the backrest biasing member 48 once the release assembly 30 has opened the first latching mechanism 40. Further, as shown in FIG. 1, the seat frame 16 also includes a seat frame biasing assembly, generally indicated at 140. The seat frame biasing assembly 140 is adapted to provide sufficient biasing force to cause the seat bottom 14 to be rotatively lifted upward and forward and move the seat frame 16 from a seating position to a tumbled position relative to the hinge mechanisms 80 after the seat backrest 12 has been folded down upon the seat bottom 14. In the preferred embodiment, as shown in FIG. 1, the vehicle seat of the present invention includes a seat frame biasing member 142 and a linkage arm 144. The seat frame biasing member 142 is a pressurized gas cartridge, which is pivotably mounted at its forward end to the hinge mechanisms 80. The linkage arm 144 is pivotably mounted to the other end of the seat frame biasing member 142 and pivotably mounted to the rear member 20. The seat frame biasing member 142 and linkage arm 144 are arranged to provide the biasing force to the rear member to tumbling the seat bottom 14 with the folded seat backrest 12 into the stowed position once the rear floor retention assemblies 82 have been released.

The fold and tumble seat assembly 10 of the present invention has a power assist fold and tumble assembly that overcomes the drawbacks and disadvantages of the prior art by having a release assembly that provides a power driven movement of the vehicle seat so that the operator input is minimized and that little or no operator effort is required to release the seat from the seating position and move it to the stowed position.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A vehicle seat assembly comprising:
   a seat backrest including a backrest frame and backrest bracket;
   a seat bottom;

a seat frame having a front member and a rear member, said seat frame operatively supporting said seat bottom and further having at least one seat backrest rotating assembly supported at said backrest frame, rear member, and seat bottom that is adapted to allow said seat backrest to move from an upright position to a folded position in which said seat backrest is folded down upon said seat bottom, said seat frame further having at least one seat rotation mechanism disposed on said front member to allow said rear member of said seat frame to be rotatively lifted upward and forward and move said seat frame from a seating position to a tumbled position relative to said front member, wherein said seat backrest rotating assembly includes a main plate, an outer plate, a rotation mechanism, and a first latching mechanism adapted to latch and selectively retain said seat backrest in said upright position;

a second latching mechanism disposed about said rear member adapted to latch and selectively retain said seat bottom to the floor of the vehicle; and a release assembly encompassed and supported by said main plate and outer plate of said seat backrest rotating assembly and having a motor and a cable assembly, said cable assembly operatively connected to said motor and said first latching assembly, said motor adapted to be remotely actuated such that actuation of said motor causes said first latching assembly to be operatively released by said cable assembly, wherein said first latching assembly includes a backrest locking arm that has a plurality of teeth disposed on its upper edge that corresponds to a plurality of teeth on the bottom of said backrest bracket to cooperate and lock said seat backrest in said upright position and a blocking arm having a blocking face and rotationally biased so that said blocking face moves against said locking arm to hold said locking arm teeth in engagement with said backrest bracket teeth when said seat backrest is in the upright position.

2. A vehicle seat assembly as set forth in claim 1 wherein said at least one backrest rotating mechanism includes a seatback biasing member that is adapted to provide sufficient biasing force to cause said seat backrest to move between said upright position to said folded position upon said seat bottom when said release assembly is actuated and said first latching mechanism is released.

3. A vehicle seat assembly as set forth in claim 2 wherein said cable assembly includes a first cable assembly and a second cable assembly, said first cable assembly operatively connected to said motor and said first latching assembly, said second cable assembly operatively connected between said seat backrest rotating assembly and said second latching mechanism such that when said motor causes said first latching assembly to be operatively released by said first cable assembly and said seat backrest operatively rotates to said folded position, said seat backrest rotating assembly causes said second latching assembly to be operatively released by said second cable assembly.

4. A vehicle seat assembly as set forth in claim 2 wherein said seat frame further includes a seat frame biasing member that is adapted to provide sufficient biasing force to cause said seat bottom to be rotatively lifted upward and forward and move said seat frame from a seating position to a tumbled position relative to said seat rotation mechanism after said seatback has been folded down upon said seat bottom and said second latching mechanism is released.

5. A vehicle seat assembly as set forth in claim 1 wherein said seat bottom is a pan that is integrated with said seat frame such that said front and rear members are disposed in spaced parallel relationship on said seat pan.

6. A vehicle seat assembly as set forth in claim 1 wherein said first latching assembly further includes a holding arm that is biased against said backrest bracket and said locking arm, said holding arm adapted to operatively ride along one edge of said backrest bracket such that said backrest bracket causes said holding arm to move against said locking arm when said locking arm rotates out of engagement with said backrest bracket so as to prevent said locking arm from engaging with said backrest bracket when said seat backrest is folded, said holding arm further adapted to operatively ride along said backrest bracket such that said backrest bracket causes said holding arm to release said locking arm allowing it to engage said backrest bracket when said seat backrest is brought to said upright position.

7. A vehicle seat assembly as set forth in claim 1 wherein said second latching mechanism includes:
   a main plate that has a receiving groove formed to accept a striker pin;
   a latching arm formed in a general hook shape adapted to capture said striker pin in said receiving groove;
   a blocking arm formed having a first blocking face and a second blocking face, said first and said second blocking faces adapted to interact with said latching arm to hold said latching arm in a latched open position and a latched closed position respectively.

8. A vehicle seat assembly as set forth in claim 7 wherein said second latching mechanism further includes a shock absorbing assembly having a shell and a resilient member, said shell adapted to retain said resilient member and said resilient member adapted to compress against said striker pin as said striker pin is received in said receiving groove.

9. A vehicle seat assembly as set forth in claim 1 wherein said release assembly further includes a release member that is operatively connected to said first latching mechanism and extends from said seat backrest, said release member adapted to be pulled outward from said seat backrest to manually actuate said release assembly.

10. A vehicle seat assembly comprising:
    a seat backrest including a backrest frame and backrest bracket;
    a seat bottom;
    a seat frame having a front member and a rear member, said seat frame operatively supporting said seat bottom and further having at least one seat backrest rotating assembly supported at said backrest frame, rear member, and seat bottom that is adapted to cause said seat backrest to move from an upright position to a folded position in which said seat backrest is folded down upon said seat bottom when said seat backrest rotating assembly is unrestrained, said seat frame further having at least one seat rotation mechanism disposed on said front member to cause said rear member of said seat frame to be rotatively lifted upward and forward and move said seat frame from a seating position to a tumbled position relative to said front member when said seat rotation mechanism is unrestrained, wherein said seat backrest rotating assembly includes a main plate, an outer plate, a rotation mechanism, and a first latching mechanism adapted to latch and selectively retain said seat backrest in said upright position;
    a second latching mechanism disposed about said rear member adapted to latch and selectively retain said seat bottom to the floor of the vehicle; and
    a release assembly encompassed and supported by said main plate and outer plate of said seat backrest rotating assembly and having a motor and a cable assembly, said cable assembly operatively connected to said motor and said first and said second latching assemblies, said motor adapted to be remotely actuated such that actuation of said motor causes said first and said second latching assemblies to be operatively released by said cable assembly, wherein said first latching assembly includes a backrest locking arm that has a plurality of teeth disposed on its upper edge that corresponds to a plurality of teeth on the bottom of said backrest bracket to cooperate and lock said seat backrest in said upright position and a blocking arm having a blocking face and rotationally biased so that said blocking face moves against said locking arm to hold said locking arm teeth in engagement with said backrest bracket teeth when said seat backrest is in the upright position.

11. A vehicle seat assembly as set forth in claim 10 wherein said at least one backrest rotating mechanism includes a seatback biasing member that is adapted to provide sufficient biasing force to cause said seat backrest to move between said upright position to said folded position upon said seat bottom when said release assembly is actuated and said first latching mechanism is released.

12. A vehicle seat assembly as set forth in claim 11 wherein said cable assembly includes a first cable assembly and a second cable assembly, said first cable assembly operatively connected to said motor and said first latching assembly, said second cable assembly operatively connected between said seat backrest rotating assembly and said second latching mechanism such that when said motor causes said first latching assembly to be operatively released by said first cable assembly and said seat backrest operatively rotates to said folded position, said seat backrest rotating assembly causes said second latching assembly to be operatively released by said second cable assembly.

13. A vehicle seat assembly as set forth in claim 11 wherein said seat frame further includes a seat frame biasing member that is adapted to provide sufficient biasing force to cause said seat bottom to be rotatively lifted upward and forward and move said seat frame from a seating position to a tumbled position relative to said seat rotation mechanism after said seatback has been folded down upon said seat bottom and said second latching mechanism is released.

14. A vehicle seat assembly as set forth in claim 10 wherein said seat bottom is a pan that is integrated with said seat frame such that said front and rear members are disposed in spaced parallel relationship on said seat pan.

15. A vehicle seat assembly as set forth in claim 10 wherein said first latching assembly further includes a holding arm that is biased against said backrest bracket and said locking arm, said holding arm adapted to operatively ride along one edge of said backrest bracket such that said backrest bracket causes said holding arm to move against said locking arm when said locking arm rotates out of engagement with said backrest bracket so as to prevent said locking arm from engaging with said backrest bracket when said seat backrest is folded, said holding arm further adapted to operatively ride along said backrest bracket such that said backrest bracket causes said holding arm to release said locking arm allowing it to engage said backrest bracket when said seat backrest is brought to said upright position.

16. A vehicle seat assembly as set forth in claim 10 wherein said second latching mechanism includes:

a main plate that has a receiving groove formed to accept a striker pin;

a latching arm formed in a general hook shape adapted to capture said striker pin in said receiving groove;

a blocking arm formed having a first blocking face and a second blocking face, said first and said second blocking faces adapted to interact with said latching arm to hold said latching arm in a latched open position and a latched closed position respectively.

17. A vehicle seat assembly as set forth in claim 16 wherein said second latching mechanism further includes a shock absorbing assembly having a shell and a resilient member, said shell adapted to retain said resilient member and said resilient member adapted to compress against said striker pin as said striker pin is received in said receiving groove.

18. A vehicle seat assembly as set forth in claim 10 wherein said release assembly further includes a release member that is operatively connected to said first latching mechanism and extends from said seat backrest, said release member adapted to be pulled outward from said seat backrest to manually actuate said release assembly.

19. A vehicle seat assembly comprising:

a seat backrest including a backrest frame;

a seat bottom;

a seat frame having a front member and a rear member, said seat frame operatively supporting said seat bottom and further having at least one seat backrest rotating assembly supported at said backrest frame, rear member, and seat bottom that is adapted to allow said seat backrest to move from an upright position to a folded position in which said seat backrest is folded down upon said seat bottom, said seat frame further having at least one seat rotation mechanism disposed on said front member to allow said rear member of said seat frame to be rotatively lifted upward and forward and move said seat frame from a seating position to a tumbled position relative to said front member, wherein said seat backrest rotating assembly includes a main plate, an outer plate, a rotation mechanism, and a first latching mechanism adapted to latch and selectively retain said seat backrest in said upright position;

a second latching mechanism disposed about said rear member adapted to latch and selectively retain said seat bottom to the floor of the vehicle; and a release assembly encompassed and supported by said main plate and outer plate of said seat backrest rotating assembly and having a motor and a cable assembly, said cable assembly operatively connected to said motor and said first latching assembly, said motor adapted to be remotely actuated such that actuation of said motor causes said first latching assembly to be operatively released by said cable assembly, wherein said second latching mechanism includes a main plate that has a receiving groove formed to accept a striker pin, a latching arm formed in a general hook shape adapted to capture said striker pin in said receiving groove, and a blocking arm formed having a first blocking face and a second blocking face adapted to interact with said latching arm to hold said latching arm in a latched open position and a latched closed position respectively.

20. A vehicle seat assembly as set forth in claim 19 wherein said second latching mechanism further includes a shock absorbing assembly having a shell and a resilient member, said shell adapted to retain said resilient member and said resilient member adapted to compress against said striker pin as said striker pin is received in said receiving groove.

21. A vehicle seat assembly comprising:

a seat backrest including a backrest frame;

a seat bottom;
a seat frame having a front member and a rear member, said seat frame operatively supporting said seat bottom and further having at least one seat backrest rotating assembly supported at said backrest frame, rear member, and seat bottom that is adapted to allow said seat backrest to move from an upright position to a folded position in which said seat backrest is folded down upon said seat bottom, said seat frame further having at least one seat rotation mechanism disposed on said front member to allow said rear member of said seat frame to be rotatively lifted upward and forward and move said seat frame from a seating position to a tumbled position relative to said front member, wherein said seat backrest rotating assembly includes a main plate, an outer plate, a rotation mechanism, and a first latching mechanism adapted to latch and selectively retain said seat backrest in said upright position;
a second latching mechanism disposed about said rear member adapted to latch and selectively retain said seat bottom to the floor of the vehicle; and
a release assembly encompassed and supported by said main plate and outer plate of said seat backrest rotating assembly and having a motor and a cable assembly, said cable assembly operatively connected to said motor and said first latching assembly, said motor adapted to be remotely actuated such that actuation of said motor causes said first latching assembly to be operatively released by said cable assembly,
wherein said release assembly further includes a release member that is operatively connected to said first latching mechanism, extends from said seat backrest, and is adapted to be pulled outward from said seat backrest to manually actuate said release assembly.

22. A vehicle seat assembly comprising:
a seat backrest including a backrest frame;
a seat bottom;
a seat frame having a front member and a rear member, said seat frame operatively supporting said seat bottom and further having at least one seat backrest rotating assembly supported at said backrest frame, rear member, and seat bottom that is adapted to cause said seat backrest to move from an upright position to a folded position in which said seat backrest is folded down upon said seat bottom when said seat backrest rotating assembly is unrestrained, said seat frame further having at least one seat rotation mechanism disposed on said front member to cause said rear member of said seat frame to be rotatively lifted upward and forward and move said seat frame from a seating position to a tumbled position relative to said front member when said seat rotation mechanism is unrestrained, wherein said seat backrest rotating assembly includes a main plate, an outer plate, a rotation mechanism, and a first latching mechanism adapted to latch and selectively retain said seat backrest in said upright position;
a second latching mechanism disposed about said rear member adapted to latch and selectively retain said seat bottom to the floor of the vehicle; and
a release assembly encompassed and supported by said main plate and outer plate of said seat backrest rotating assembly and having a motor and a cable assembly, said cable assembly operatively connected to said motor and said first and said second latching assemblies, said motor adapted to be remotely actuated such that actuation of said motor causes said first and said second latching assemblies to be operatively released by said cable assembly,
wherein said second latching mechanism includes a main plate that has a receiving groove formed to accept a striker pin, a latching arm formed in a general hook shape adapted to capture said striker pin in said receiving groove, and a blocking arm formed having a first blocking face and a second blocking face adapted to interact with said latching arm to hold said latching arm in a latched open position and a latched closed position respectively.

23. A vehicle seat assembly as set forth in claim 22 wherein said second latching mechanism further includes a shock absorbing assembly having a shell and a resilient member, said shell adapted to retain said resilient member and said resilient member adapted to compress against said striker pin as said striker pin is received in said receiving groove.

24. A vehicle seat assembly comprising:
a seat backrest including a backrest frame;
a seat bottom;
a seat frame having a front member and a rear member, said seat frame operatively supporting said seat bottom and further having at least one seat backrest rotating assembly supported at said backrest frame, rear member, and seat bottom that is adapted to cause said seat backrest to move from an upright position to a folded position in which said seat backrest is folded down upon said seat bottom when said seat backrest rotating assembly is unrestrained, said seat frame further having at least one seat rotation mechanism disposed on said front member to cause said rear member of said seat frame to be rotatively lifted upward and forward and move said seat frame from a seating position to a tumbled position relative to said front member when said seat rotation mechanism is unrestrained, wherein said seat backrest rotating assembly includes a main plate, an outer plate, a rotation mechanism, and a first latching mechanism adapted to latch and selectively retain said seat backrest in said upright position;
a second latching mechanism disposed about said rear member adapted to latch and selectively retain said seat bottom to the floor of the vehicle; and
a release assembly encompassed and supported by said main plate and outer plate of said seat backrest rotating assembly and having a motor and a cable assembly, said cable assembly operatively connected to said motor and said first and said second latching assemblies, said motor adapted to be remotely actuated such that actuation of said motor causes said first and said second latching assemblies to be operatively released by said cable assembly,
wherein said release assembly further includes a release member that is operatively connected to said first latching mechanism, extends from said seat backrest, and is adapted to be pulled outward from said seat backrest to manually actuate said release assembly.

* * * * *